(12) United States Patent
Van Der Woude

(10) Patent No.: US 6,196,213 B1
(45) Date of Patent: Mar. 6, 2001

(54) BARBECUE TABLE

(76) Inventor: Meino Jan Van Der Woude, Oude Slingeweg 2, 9204 WS Drachten (NL)

( * ) Notice: Subject to any disclaimer, the term of this patent is extended or adjusted under 35 U.S.C. 154(b) by 0 days.

(21) Appl. No.: 08/836,802

(22) PCT Filed: Jan. 15, 1996

(86) PCT No.: PCT/NL96/00029

§ 371 Date: May 19, 1997

§ 102(e) Date: May 19, 1997

(87) PCT Pub. No.: WO96/21385

PCT Pub. Date: Jul. 18, 1996

(30) Foreign Application Priority Data

Jan. 13, 1995 (NL) .................................................. 9500068

(51) Int. Cl.[7] .................................................. S24C 5/00
(52) U.S. Cl. .................... 126/50; 126/9 R; 126/25 R; 126/39 H; 99/422; 99/425
(58) Field of Search .................... 126/29, 30, 39 H, 126/39 K, 50, 9 R, 25 R, 39 N, 39 J, 42, 214 A, 218, 40, 38, 39 B, 252, 254, 256; 99/422, 447, 337, 449, 425; 431/350; 312/236

(56) References Cited

U.S. PATENT DOCUMENTS

| 163,858 | * | 6/1875 | Enos | 126/42 |
|---|---|---|---|---|
| 279,276 | * | 6/1883 | Pierce | 126/25 R |
| D. 303,481 | * | 9/1989 | Savell | D7/363 |
| 930,691 | * | 8/1909 | Risse | 126/39 K |
| 1,224,497 | * | 5/1917 | O'Dowd | 126/39 |
| 1,287,405 | * | 12/1918 | O'Dowd | 126/39 |
| 1,552,479 | * | 9/1925 | Goldberg et al. | 126/25 R |
| 1,608,309 | * | 11/1926 | Dickey | 126/25 R |
| 1,764,719 | * | 6/1930 | Gercich | 126/38 |
| 2,211,924 | * | 8/1940 | Forster | 126/38 |
| 2,771,873 | * | 11/1956 | Baker, Jr. | 126/42 |
| 2,772,414 | * | 11/1956 | Baker, Jr. | 126/42 |
| 3,091,284 | * | 5/1963 | Burklin | 431/350 |
| 3,277,881 | * | 10/1966 | Bruns | 126/40 |
| 3,630,649 | * | 12/1971 | Leeds et al. | 431/350 |
| 3,791,368 | * | 2/1974 | Hunt | 126/9 R |
| 3,794,013 | * | 2/1974 | Upton | 126/40 |
| 3,824,984 | * | 7/1974 | Swanson et al. | 126/25 R |
| 4,082,993 | * | 4/1978 | Oakes | 126/40 |
| 4,108,142 | * | 8/1978 | Barson et al. | 126/41 R |
| 4,201,184 | * | 5/1980 | Scheidler et al. | 126/39 J |
| 4,342,259 | * | 8/1982 | Lee | 99/447 |
| 4,369,763 | * | 1/1983 | Sullivan | 126/37 R |
| 4,570,610 | * | 2/1986 | Himmel | 99/422 |
| 4,718,399 | * | 1/1988 | Shepherd | 126/25 R |
| 4,809,671 | * | 3/1989 | Vallejo, Jr. | 126/25 R |
| 4,815,426 | * | 3/1989 | Henschel | 431/350 |
| 5,072,718 | * | 12/1991 | Seal | 126/25 R |
| 5,090,398 | * | 2/1992 | Raymer et al. | 126/25 R |
| 5,370,527 | * | 12/1994 | Hefling et al. | 126/39 R |
| 5,467,695 | * | 11/1995 | Keller et al. | 99/422 |
| 5,495,845 | * | 3/1996 | Hait | 126/25 R |
| 5,782,172 | * | 7/1998 | Schacht | 99/422 |

FOREIGN PATENT DOCUMENTS

785476 * 8/1935 (FR) ....................................... 126/39

* cited by examiner

Primary Examiner—Ira S. Lazarus
Assistant Examiner—David Lee
(74) Attorney, Agent, or Firm—Mark Zovko

(57) ABSTRACT

A barbecue table having a frame and a top connected to the frame. The top serves as a table and is formed by a flat metal plate. A heating element is arranged under the metal plate and connected to the frame. The heating element is mounted on the underside of the metal plate and heats the metal plate allowing food to be prepared thereon.

2 Claims, 2 Drawing Sheets

BARBECUE TABLE

BACKGROUND OF THE INVENTION

The invention relates to a barbecue table as described herein. Such a barbecue table is known from the American patent specification 4 108 142.

The wall member of this known barbecue forms a separate annular metal trough capable of collecting cooking liquids from the metal plate and at the same time together with the metal plate shielding the burner from wind.

Although the known barbecue table is portable, due to the trough it has large dimensions which makes it unsuitable to be taken along, for instance on recreational trips.

BRIEF SUMMARY OF THE INVENTION

The invention has for its object to provide a barbecue table of the type described in the preamble which can be embodied compactly so that it can be carried easily, for instance for recreational purposes elsewhere.

This object is achieved with the barbecue table according to the invention in that the wall member is an upwardly diverging burner wind guard closely surrounding the burner and the metal plate at all sides extends beyond the wind guard. In this way, the table top with burner and wind guard can form a unit with relatively limited dimensions, which can easily be stored flatly, for instance on the bottom of a car trunk.

The burner is mounted on the sub-frame and the sub-frame is mounted on the frame against the underside of the metal plate. This feature is preferably used for a robust construction. The burner and sub-frame are mounted detachably in the preferred embodiment. The burner can then be easily detached together with the sub-frame and be transported or stored separately or, in the case of malfunction, simply be replaced by another. When the burner according to the invention is releasable it can also be used for other purposes, for instance for cooking. The sub-frame is then embodied in suitable manner such that a pan can be placed thereon.

A very advantageous further embodiment is possible if metal plate is fixed to the frame. Because the metal plate forms part of the frame, the further parts of the frame can be embodied very simply, so that a relatively light and compact unit is obtained which is still sufficiently strong and stable.

In a preferred embodiment it is achieved that the burner is held at the correct distance from the metal plate at all times so that optimum operation of this burner is ensured.

A very suitable further development in this respect is characterized in the preferred embodiment. The tube part bent into a V-shape forms an extra covering for the burner, whereby it continues to function well even in strong wind.

A suitable embodiment is characterized by the following. The wooden surface can be used as placing surface for the ingredients for cooking and frying and the tableware. The plate can be cleaned easily. Possible burnt-on parts can be loosened with a spatula, pushed over the free edge of the metal plate and collected thereunder.

A further favourable development in this respect is provided. The burnt-on parts loosened with a spatula can be pushed in the gutter which can be emptied afterwards.

For this purpose the gutter is preferably detachable. The barbecue table itself can remain in its place and the waste for disposal is taken with the gutter to a suitable place, where the gutter is emptied and cleaned.

A suitable embodiment is provided. The rectangular shape of the steel plate results in areas with a slightly lower temperature on the short sides, which are slightly further removed from the burner than the long sides, which areas are suitable for keeping already prepared food warm or for preheating food still to be prepared. The raised edges ensure that the oil used during frying does not drip off the plate, while the plate can however still be cleaned well using a spatula.

It is noted that from U.S. Pat. No. 3,794,013 a portable gas grill is known, comprising a metal plate having a gas burner mounted therebelow. The dimensions of said gas grill are very limited so that in principle it would be suitable for easy transportation. However, due to the long stretched form of the burner and the lack of any wind guard, it cannot be used outdoors in a satisfactory manner.

German "Offenlegungsschrift" 3 501 882 shows a barbecue table having a table top with a metal plate and no further elements below that metal plate, so that it can be easily transported. The plate, however, is heated by an electrical heating element, such that it can only function in the immediate vicinity of a mains outlet, so that it cannot be usefully taken along, for instance for recreational purposes in the countryside.

The invention is further elucidated in the following description with reference to the annexed figures.

DETAILED DESCRIPTION OF THE INVENTION

Figure 1:
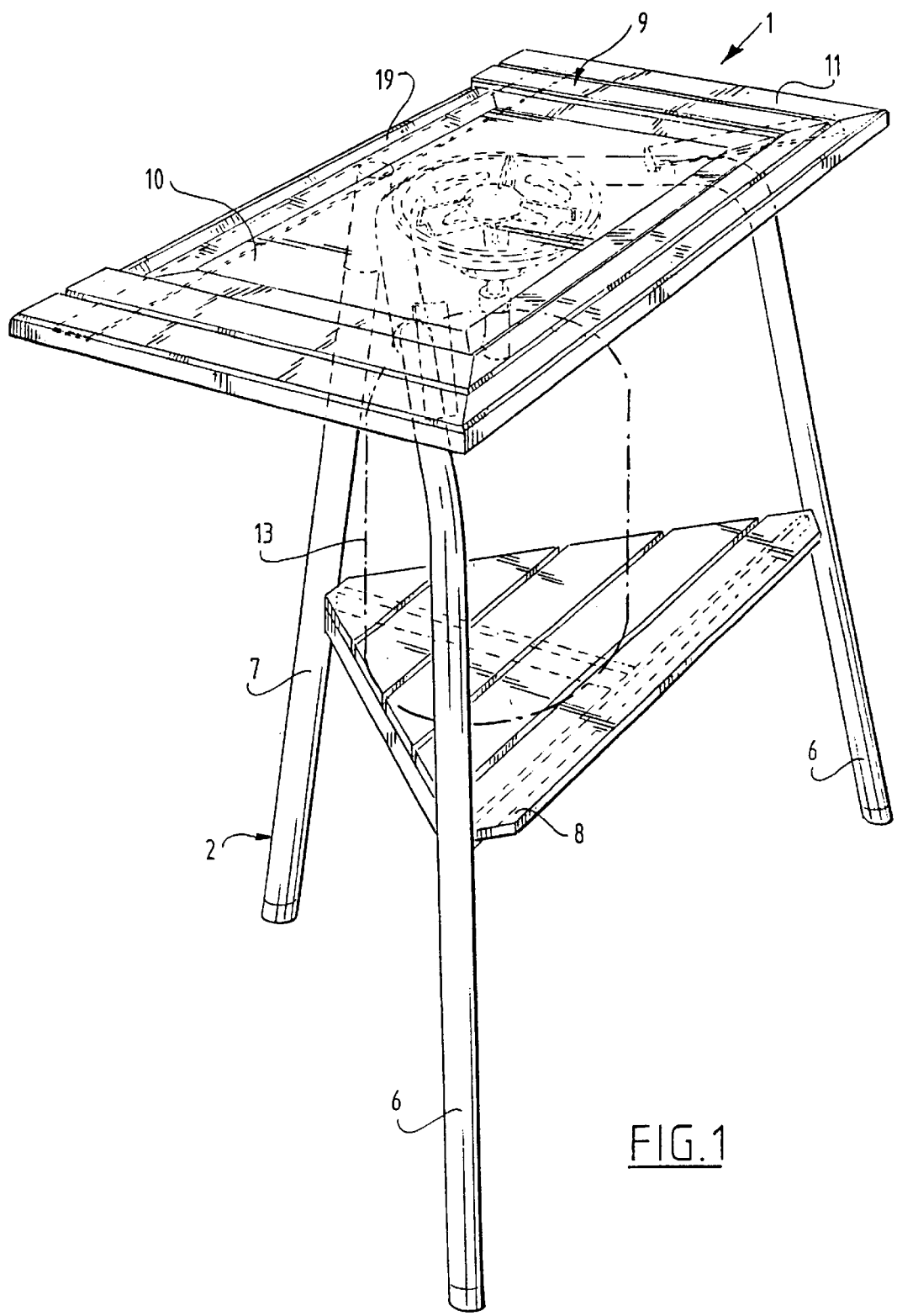
FIG. 1 shows a perspective view of a preferred embodiment of the barbecue table according to the invention.

The barbecue table 1 according to the invention shown in FIG. 1 comprises a frame 2 by which a table top 9 is supported. The frame comprises two front legs 6 and a rear leg 7. The front legs 6 are placed with their bent upper end into the end parts 5 of a flat-lying tube part 3 bent into a V-shape. Welded fixedly to the V-shaped tube part 3 is a standing tube stub 4 in which the leg 7 is received.

The legs 6, 7 are mutually connected about halfway along their height by a support surface 8. This provides a greater rigidity to the frame, so that the table top 9 is supported in stable manner.

In the case the barbecue table 1 is embodied for disassembly the support surface 8 can be fastened to the legs 6, 7 with for instance bolts with wing nuts.

The table top 9 is partly formed by a substantially flat metal plate 10, which in this embodiment is a 6 mm thick steel plate. With this thickness and this material a very advantageous frying surface is obtained which has a uniform temperature and a good heat capacity.

The table top 9 further comprises a wooden surface 11 extending on three sides round the rectangular steel plate 10. This surface 11 can be used for setting down ingredients, tableware and the like. Since wood is a good heat insulator, objects placed on wooden surface 11 will not be heated, even when steel plate 10 is heated to a high temperature.

Figure 2:
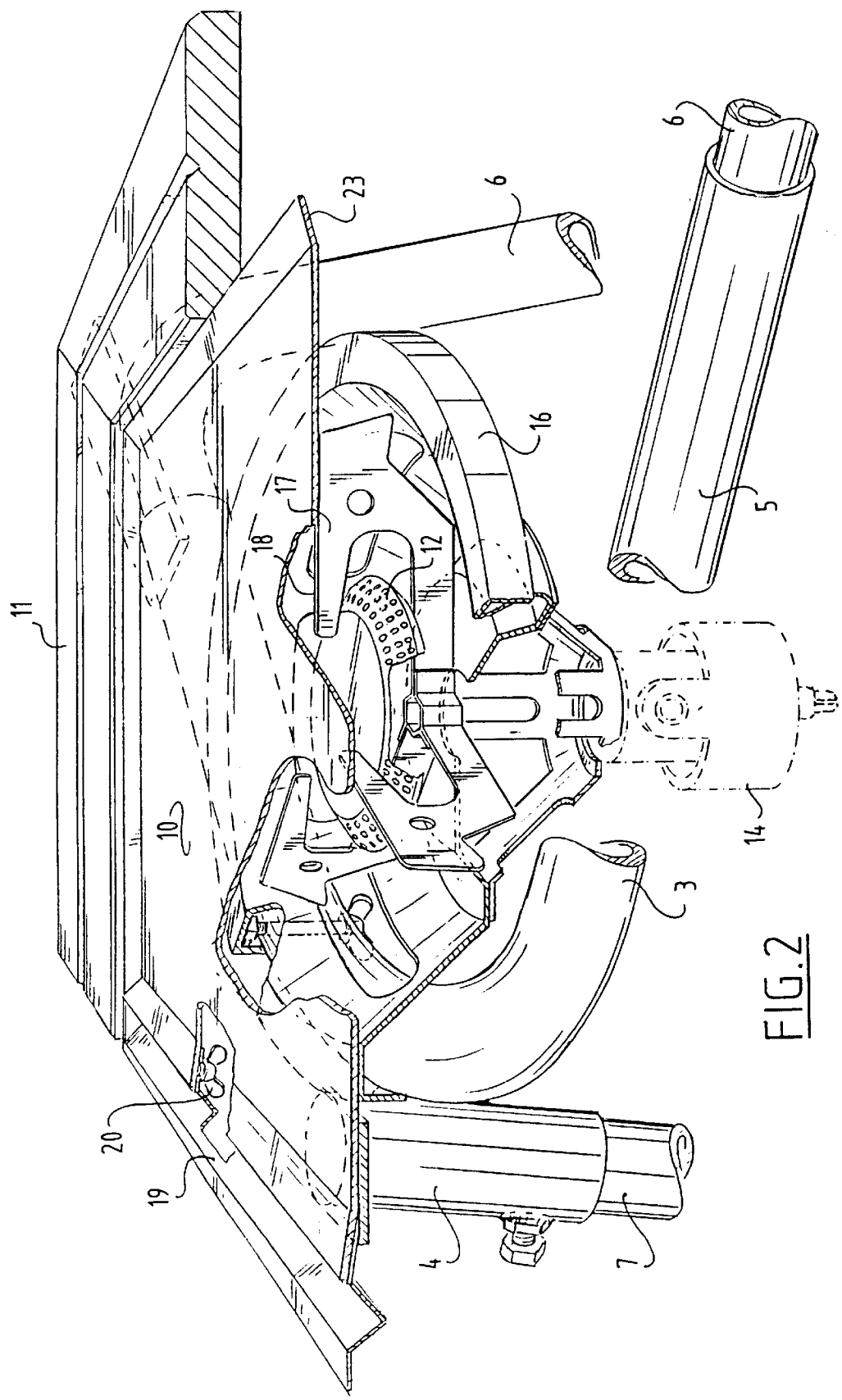
FIG. 2 shows a partly broken away view of the barbecue table shown in FIG. 1.

As shown particularly in FIG. 2, the edge 23 of the steel plate is bent upward through a small angle, in particular an angle of about 5°. The raised edge 23 ensures that oil and/or other liquids used in frying cannot drip off the plate. Even when table top 9 is not disposed entirely horizontally, the liquids used will still remain lying on the plate in reliable manner.

On the other hand, the raised edges 23 do not hinder cleaning of the plate. The plate can easily be scraped clean with a spatula, wherein the scrapings can be collected on the free edge of steel plate 10.

In the shown preferred embodiment a detachable gutter 19 is arranged along the free edge of steel plate 10 to collect the scrapings. This gutter is fixed using threaded ends which are spot welded to plate 10 and which have wing nuts 20 engaging thereon. The gutter 19 can be detached simply by slightly loosening wing nuts 20 and the scrapings collected in gutter 19 can be thrown away at a suitable location.

As shown particularly in FIG. 2, the burner 12 is provided with a wind guard 16 which forms part of a sub-frame with which the burner is fixed to the frame 2 against the underside of plate 10. The wind guard 16 is mounted close-fittingly in the bend of the V-shaped tube part 3. The wind guard 16 is provided with a plurality of slotted apertures in its periphery through which secondary combustion air is supplied to burner 12. By fitting the burner with wind guard 16 in the bend of V-shaped tube part 3 a good wind sealing is obtained. The V-shaped tube part 3 forms an extra shield preventing the wind from blowing directly against the burner via the apertures in wind guard 16. For optimum operation of the shielding effect the barbecue table 1 is placed with the rear leg 7 in the direction of the wind.

The burner 12 is mounted in a sub-frame which is provided with supports 17, the upper edges 18 of which normally speaking define a supporting surface for an object for heating such as a pan. The burner 12 is mounted with this sub-frame to the frame 2 such that the upper edges 18 of supports 17 at least almost make contact with the underside of plate 10. The supports 17 thus form a spacer which defines the correct distance from the burner 12 to the plate 10.

In FIG. 2 only the burner head of burner 12 is shown. Extending downward in per se known manner on the underside of the burner head is a shaft through which the combustion gas is supplied. On the underside the burner carries a coupling 14 to which a gas bottle can be screwed. As shown in FIG. 1, a gas bottle 13 of considerable capacity can be used. A large gas bottle 13 is used particularly when barbecue table 1 is intended as an emergency provision and will thus be used a great deal. When a large gas bottle 13 is used the support surface 8 is mounted to legs 6, 7 at a height such that the gas bottle is supported by the support surface 8.

For recreational use of the barbecue table 1 according to the invention a smaller gas bottle can be used, so that barbecue table 1 becomes easily transportable. The support surface 8 can in that case be used for temporary setting aside of ingredients, kitchen utensils and the like.

The burner is releasably attached to the frame 2, so that it can also be used separately together with a gas bottle.

The invention is not limited to the embodiment shown in the figures but comprises all embodiment variants which fall within the scope of the accompanying claims.

What is claimed is:

1. Barbecue table comprising a frame supporting a table top connected to the frame wherein the table top is formed at least partially by a substantially flat metal plate, said flat metal plate being continuous and having perimeter sides and an underside wherein under the metal plate is arranged a gas burner, the gas burner being mounted on a sub-frame and the sub-frame being mounted on the frame adjacent the underside of the metal plate, the sub-frame being a spacer defining a predetermined distance from the gas burner to the metal plate, the sub-frame being provided with a plurality of supports which define a supporting surface for supporting an object to be heated, the gas burner being mounted detachably on the sub-frame such that the supports are substantially in contact with the underside of the metal plate, and a wall member arranged under the metal plate and around the gas burner, the wall member together with the metal plate enclosing the gas burner, characterized by said wall member being an upwardly diverging burner wind guard closely surrounding the gas burner, and said metal plate at all perimeter sides extending beyond said wind guard.

2. Barbecue table as claimed in claim 1, wherein said frame comprises a flat-lying tube part bent into a V-shape under the metal plate and said wind guard is mounted close-fittingly into said tube part bent into a V-shape.

* * * * *